Figure 1:
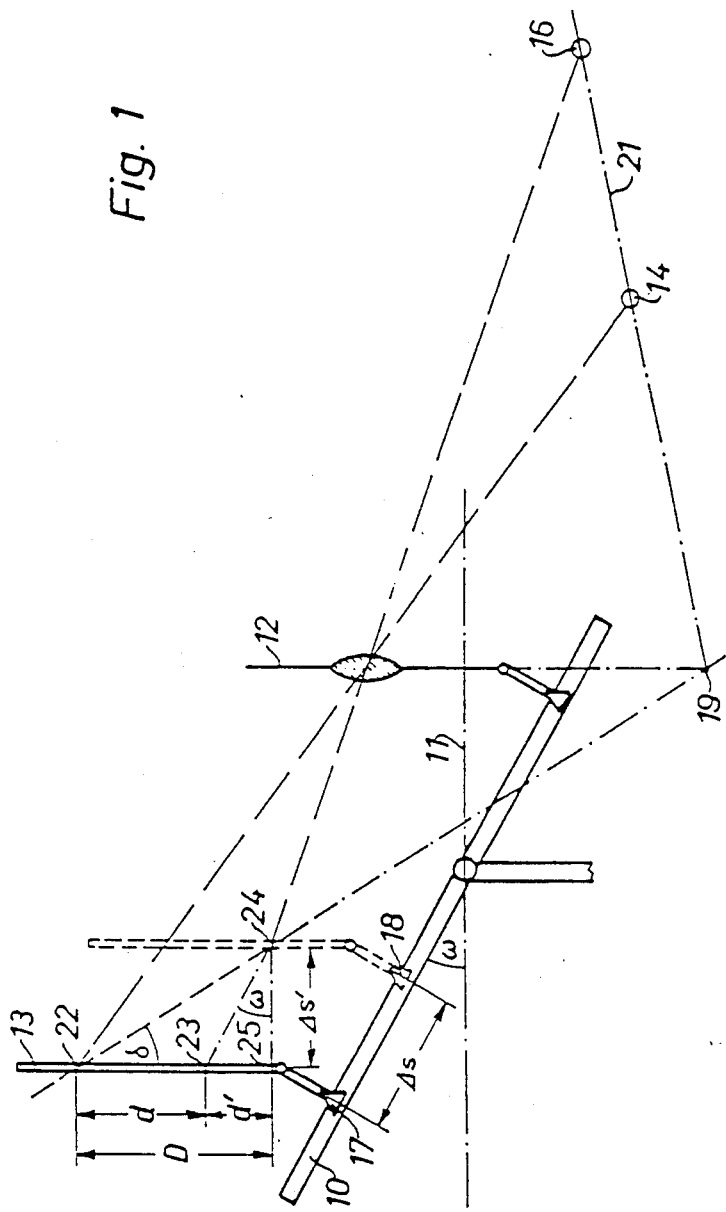

United States Patent [19]

Vogt

[11] Patent Number: 4,692,007
[45] Date of Patent: Sep. 8, 1987

[54] PHOTOGRAPHIC CAMERA

[76] Inventor: Philippe Vogt, Frohalpstrasse 65, CH-8038 Zurich, Switzerland

[21] Appl. No.: 894,672
[22] PCT Filed: Oct. 9, 1985
[86] PCT No.: PCT/CH85/00152
    § 371 Date: Aug. 8, 1986
    § 102(e) Date: Aug. 8, 1986
[87] PCT Pub. No.: WO86/02465
    PCT Pub. Date: Apr. 24, 1986

[30] Foreign Application Priority Data

Oct. 10, 1984 [CH] Switzerland ............... 4859/84

[51] Int. Cl.⁴ .................. G03B 19/10; G03B 27/68
[52] U.S. Cl. .................... 354/160; 354/188; 354/189
[58] Field of Search ............. 354/160, 188, 189

[56] References Cited

U.S. PATENT DOCUMENTS 2,301,921  11/1942  Willcox .................. 354/189 X
3,479,945  11/1969  Koch ..................... 354/189 X
3,825,938   7/1974  Koch ..................... 354/189 X
4,564,277   1/1986  Koch et al. .............. 354/189 X Primary Examiner—W. B. Perkey
Attorney, Agent, or Firm—Ostrolenk, Faber, Gerb & Soffen

[57] ABSTRACT

The professional camera comprises a plurality of electronic measurement sensors. A first measurement sensor (37, 38) is intended for the angle (ω) by which the base (10) of the camera is inclined to the horizontal during focusing. A second measurement sensor (42, 43) is intended for the displacement (Δs) by which the image standard (13, 17) must be displaced along the base of the camera if two objects located different distances from the lens (12) are to be sharply focused. A third measurement sensor is associated with the distance (d) between the image of the two objects perpendicular to the axis of inclination of the base of the camera. The camera furthermore comprises an electronic circuit (30) which processes the output signals of the measurement sensors and at the output (48 of which a signal appears which corresponds to the angle (δ) by which the image plane (13) must be swung in order sharply to focus both the objects (14, 16) at the same time. The professional camera permits the determination of the angle of swing (δ) from the displacement (Δs) of the vertically arranged image plane (13) along the base (10) of the camera independently of the angle of inclination (ω) of the base of the camera to the horizontal (11).

7 Claims, 3 Drawing Figures

PHOTOGRAPHIC CAMERA

The present invention concerns a professional camera having a rail which forms the base of the camera and having a lens standard and an image standard which are displaceable independently of each other on said rail and on which there are arranged a lens support and image holder respectively which are swingable around at least one axis aligned transversely to the base of the camera, and having a ground glass which is adapted to be attached to the image holder and has at least two focusing lines extending parallel to the swivel axis of said holder.

For the simultaneous sharp focusing of two objects or parts of objects which are at different distances from the photographic lens of a camera, the image plane and/or the principal plane of the lens must be swung in such a manner that their extensions intersect the extension of the line connecting the objects to be photographed at a common point. Since the objects to be photographed are generally at a distance laterally as well as vertically from each other, the lens and image holders of a professional camera are swingable around two axes which are aligned perpendicular to each other and transverse to the base of the camera so that the above-mentioned imaging condition can be complied with. In this connection it must be borne in mind that the swiveling of the lens or image holder around an axis which does not pass through the center of the lens or the image holder produces a change in the optical distance between lens and image holders (the picture width) and that the swiveling around a vertical axis the swivel joint of which is located below the horizontal swivel axis produces a lateral displacement of the image on the image holder. In order to avoid, in particular, the first-mentioned error in focusing and the repeated refocusing necessary to correct it, it is known from Swiss Pat. No. 536 499 to calculate the swing of the image holder necessary for sharp focusing on two objects which are at a different distance away, from that displacement of the image standard along the base of the camera which is necessary for the sharp focusing of each of these objects and from the distance apart, measured at right angles to the swivel axis, of the two objects in the image plane or of the parallel extending lines passing through these imaged objects. The trigonometric formula used for this is, however, only valid if the image holder is at right angles to the base of the camera which determines the direction of displacement. This focusing error greatly limits the possibilities of use of the known focusing method and of the camera intended for the carrying out thereof, since the professional camera must be inclined to the horizontal for most photographs, for instance for architectural photographs in order to avoid so-called convergent lines or, in case of studio photographs, in order to establish preferred photographic angles. A simple calculation shows that, for instance, with an inclination of the camera base by only 15°, a distance (measured perpendicular to the swivel axis) of 20 mm between the two objects focused on the image holder and with a displacement of the image holder along the camera base by 40 mm, which is necessary for the sharp focusing of each of these objects, the swivel angle calculated in accordance with this formula gives an error of 11.5°. This error becomes greater the more the base of the camera is inclined and the smaller the distance between the objects focused on the image holder relative to the displacement of the image holder along the camera.

Therefore, the object of the present invention is to create a professional camera in which the swing of the image plane necessary for the sharp focusing of two objects at different distances from the lens is calculated from the longitudinal displacement of the image standard on the camera base and the distance, measured perpendicular to the swivel axis, between the image points on a vertically standing image plane, regardless of the inclination of the camera base.

In accordance with the invention, this object is achieved with a professional camera of the aforementioned type which is characterized by the fact that the rail which forms the camera base has associated with it an electronic measurement sensor for the angle of inclination and that at least the image standard has associated with it an electronic measurement sensor for its displacement along the camera base and that there is also provided an electronic circuit which, from the entered measurement values for the distance, measured perpendicular to the swivel axis, between the two image points on the ground glass and for the angle of inclination of the camera base and for the displacement of the vertical image standard along the camera base, calculates the angle of swing for the image holder which is necessary for the simultaneous sharp focusing of both image points on the ground glass.

With the professional camera of the invention it is possible, even with a camera base which is inclined at any angle and with vertically aligned image holder, to calculate the swing of the image holder necessary for the sharp focusing of two image points which are at a different distance from the camera from the vertical distance between the two image points on the ground glass and the displacement of the image standard along the camera base which is necessary for the sharp focusing of one and the other image points. In this connection, the use of electronic measurement sensors and the processing of the output signals of these measurement sensors in this circuit permit a precision which was not attainable with the previously known mechanical focusing devices.

Figure 2:
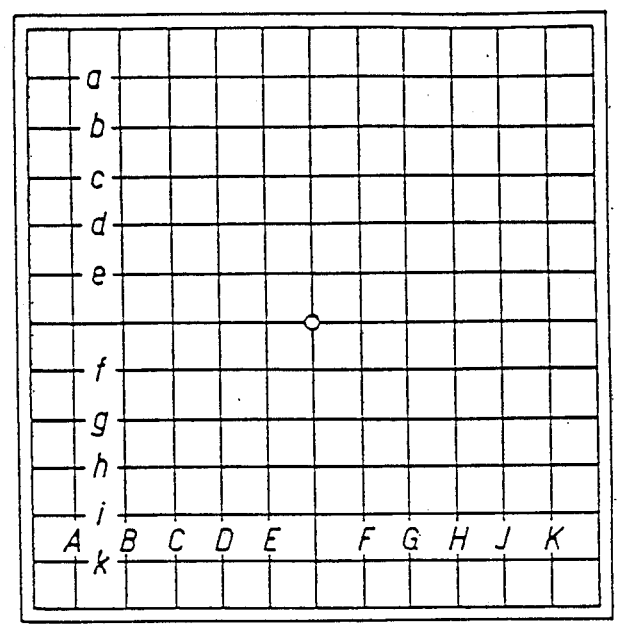
Figure 3:
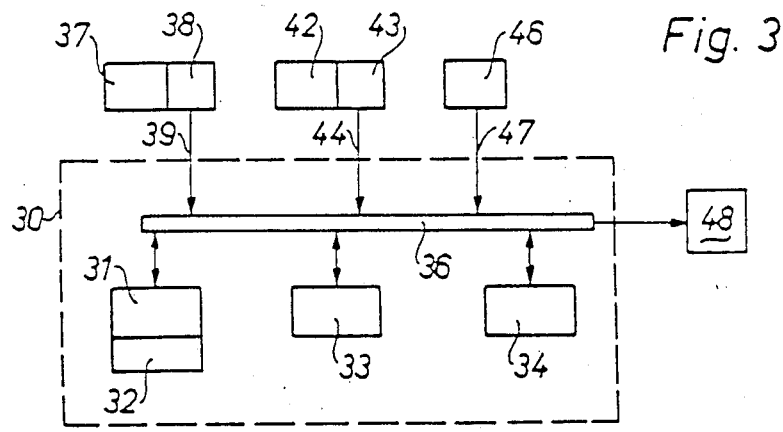

The operation of the professional camera of the invention will be described below with reference to the figures of the drawing, in which:

FIG. 1 shows the basic diagram for the determination of the swinging of an image holder in order sharply to focus two objects which are a different distance from the photographic lens simultaneously on a ground glass, as well as the scalene triangle by means of which the necessary angle of swing can be calculated when the camera base is inclined with respect to the horizontal and the image holder is vertical, FIG. 2 shows the preferred embodiment of a ground glass for insertion in the image holder during the focusing of the camera, and FIG. 3 is a block diagram of one possible embodiment of the electronic evaluation circuit.

The basic diagram of FIG. 1 shows a camera base 10 which is inclined to the horizontal 11 by the angle ω, as well as the vertically aligned principal plane 12 of a lens and the image plane 13 of an image holder. FIG. 1 also shows two objects 14 and 16 (or parts of an object). The distance of the object 14 from the lens is less than the distance of the object 16 from the lens. Let us assume that for the sharp focusing in the image plane of the object 14, which is closer to the lens, the image standard (not shown) must be pushed into the position 17 of the camera base and that for the sharp focusing of the object 16, which is further from the lens, it must be pushed by the distance Δs into the position 18. Furthermore, let us assume that the vertical distance between the points focused in the image plane or the straight lines which extend through these points and are parallel to the horizontal swivel axis of the image standard has the length d.

For the simultaneous sharp focusing of the two objects 14, 16 in the image plane, said plane must be swung by an angle δ around a horizontal axis until the extension of the image plane passes through the point of intersection 19 at which the extensions of the principal plane 12 of the lens and of the line 21 connecting the objects 14 and 16 intersect. This condition satisfies Scheimpflug's condition, which is well known to every person skilled in the art.

As can be noted from the figure, the angle δ is an inner angle of the scalene triangle 22, 23, 24, the two adjacent shorter sides d and Δs of which as well as the angle ε=(90°+ω) enclosed by said sides are known. For the calculating of the angle δ the scalene triangle is simply supplemented to form a right triangle 22, 25, 24. The height (opposite side) of this right triangle, in accordance with the well-known trigonomic functions Δs′=cos ω·Δs, and the base (cathetus) is D=d+d′=d+sin ω·Δs.

For the angle δ we then have:

$$\tan\delta = \frac{\cos\omega \cdot \Delta s}{d + \sin\omega \cdot \Delta s}$$

For the determination of the distance d between the sharply focused points in the image plane, use is preferably made of a ground glass in accordance with FIG. 2. This ground glass has lines arranged at right angles to each other which form a focusing grid and are identified by letters. In the example shown, the horizontal focusing lines are designated by the upper-case letters A to K and the vertical focusing lines by the lower-case letters a to k. The distance between two adjacent focusing lines is predetermined and constant and it amounts, for instance, to 10 mm. This division of the ground glass makes it possible to indicate the position of each point focused thereon and the distance between two points which is necessary for the above-described calculation of the angle of swing δ.

For the displacement of the image standard along the base of the camera, a rack is provided in the base and the standard has a pinion which engages in said rack. The pinion cooperates with an electromechanical pulse generator which, upon displacement of the standard, produces a number of pulses which is proportional to the displacement length.

For the determination of the angle of inclination ω of the base of the camera, use can be made in simple fashion of a potentiometer which is arranged on the joint which connects the base of the camera to a stand.

Pulse generators and potentiometers which can be used for the purpose described are known to every person skilled in the art, for which reason a detailed description of them can be expressly dispensed with here. The same applies to other electronic or electromechanical elements which can be used instead of the pulse generator or potentiometer in order to produce electric output signals which correspond to the displacement of the image standard and the inclination of the camera base.

FIG. 3 shows a block diagram of one embodiment of the electronic circuit which calculates the desired angle of swing δ from the inputted values for the angle of inclination ω, the path of displacement Δs and the distance d between the image points.

The circuit contains a central unit 30 with a control unit 31 and associated register 32, an arithmetic unit 33 and a main memory 34, all of which are connected to each other by a data bus 36 and control lines (not shown). The central unit is preferably developed as a microprocessor. A first input device 37 is provided for the angle of inclination ω and, as already described, contains a potentiometer which produces an analog output signal which corresponds to the inclination to the horizontal of the base of the camera arranged on a stand. This input device has associated with it an analog-digital converter 38 which converts the output signal of the potentiometer into a digital signal which is fed via a first data line 39 to the data bus 36 of the central unit. A second input device 42 is developed as a pulse generator which, upon the displacement of the image standard along the base of the camera, produces a series of pulses the number of which is proportional to the path of displacement. With the pulse generator there is associated a counter 43 which is reset to zero before the start of the camera focusing and which counts the pulses produced during the displacement of the image stand over a path Δs. The output signal of the counter is conducted via a second data line 44 also to the data bus 36. A third input device 46 is developed as a keyboard into which the coordinates determining the distance between the image points on the ground glass are keyed and which transmits the corresponding data via the data line 47 to the data bus 36.

The circuit also contains a data output device 48 which is connected via a data line 41 to the data bus 49. The data output device is developed in simple manner as an optical display device, on the screen or display elements of which the desired angle value δ appears.

Upon the use of the professional camera of the invention, the camera base is first of all inclined in such a manner that the object or objects to be photographed appear with the desired viewing angle on the ground glass. The angle of inclination necessary for this then forms the signal at the output of the analog/digital converter 37. The (vertical) ground glass is then displaced along the base of the camera until a first desired object or part of an object is sharply focused. The counter 43 is then reset to zero and the ground glass then displaced until a second desired object or another part of an object is sharply focused. The number of pulses corresponding to the displacement path Δs then appears as output signal of the counter 43. Finally, the indices of those focusing lines on or near which the two objects or parts of objects are sharply focused are input by the photographer into the keyboard 46, at whose output there then appears a digital signal which corresponds to the distance d measured transverse to the direction of said focusing lines.

Under the control of the control unit the cosine of the adjusted angle of inclination ω is then read from the main memory and multiplied by the value for the path Δs, the product cos ω·Δs being temporarily stored. The sine of the angle of inclination ω is then read and multiplied by the value for the path Δs, whereupon the distance d between the focusing lines is added to this product and the sum d+sin ω·Δ s temporarily stored. From these two temporarily stored values there is then formed the quotient $$\tan\delta = \frac{\cos\omega \cdot \Delta s}{d + \sin \Delta s}$$

and the angle δ corresponding to tan δ is read out of the main storage and displayed on the data output device.

The embodiment of the electronic circuit which has been briefly described above and its function are known or understandable to every man skilled in the art, so that a more detailed description is expressly dispensed with. In this connection it is self-evident that the same result can also be obtained with a circuit of different construction. For instance, it is possible to dispense with the storing of angle function tables and provide instead a program which each time calculates each angle function. For small angles of inclination ω the sine functions can also be replaced by tangent functions or the radian measure, since within this region they differ very little from each other and therefore the arithmetic error remains within permissible limits. It is also possible to dispense with the input device for the distance d between the focusing lines and to read a fixed value d* into the main memory if a ground glass having only two focusing lines is used.

Although in the above description and also in the figures the swinging of the image holder around only one axis (the horizontal axis) has been described and shown, it is expressly pointed out that the camera of the invention is equally suitable for also calculating the angle of swing around the second (vertical) axis. The difference from the camera described above and its manner of operation is that the vertical angle of swing also has a measurement sensor 37' associated with it and that the horizontal distance between the two focusing lines on or in the vicinity of which the two image points lie is keyed as distance d' into a third input device 46' which is suitable for this purpose.

It is also self-evident that the measurement sensors for the swinging and the displacement need not necessarily be arranged only on the image standard or holder but could just as well as arranged on the lens standard or holder or on both. It is also possible to provide further measurement sensors instead of or in addition to the data output device for the transfer of a calculated setting from image holder to lens holder (or vice versa) and to use an electronic monitoring circuit which produces a signal when the swing of the lens or image holder corresponds to the calculated swing. Finally, it is possible further to develop the electronic circuit and use it not only for the calculating of the angle or angles of swing but also for the automatic setting of the shutter time and/or aperture.

I claim:

1. A professional camera having a rail which forms the base of the camera and can be inclined to the horizontal and having a lens standard and an image standard which are displaceable on said rail independently of each other and on which a lens support and an image holder respectively which are swingable around at least one axis which is directed transverse to the base of the camera are arranged, and having a ground glass which is adapted to be attached to the image holder and has at least two focusing lines which extend parallel to the axis of swing of said holder, characterized by the fact that the rail (10) which forms the base of the camera has, associated with it, an electronic measurement sensor (37, 38) for its angle of inclination (ω) and at least the image standard has associated with it an electronic measurement sensor (42, 43) for its displacement along the base of the camera, and furthermore there is also provided an electronic circuit (30) which, from the inputted measurement values for the distance (d) between the two image point (22, 23) on the ground glass measured perpendicular to the swivel axis, the angle of inclination (ω) of the base of the camera and the displacement (Δs) of the vertically standing image standard along the base of the camera, calculates the angle of swing (δ) of the image holder which is necessary for the simultaneously sharp focusing of the two image points on the ground glass.

2. A professional camera according to claim 1, characterized by the fact that the image and/or lens holder is swingable around two axes which are transverse to the base of the camera and at right angles to each other and that the ground glass has at least two pairs of focusing lines one of which is parallel to the one swivel axis and the other parallel to the other swivel axis.

3. A professional camera according to claim 2, characterized by the fact that the ground glass (FIG. 2) has a plurality of focusing lines which are aligned at right angles to each other, the one lines which are aligned parallel to each other and the other lines which are directed at right angles thereto being identified by different symbols (A to K and a to k respectively).

4. A professional camera according to claim 1, characterized by the fact that the electronic circuit (30) comprises a control unit (31) having an associated register (32) and a main memory (34) within which there are stored angle functions and an arithmetic program which controls an arithmetic unit (33) for the calculation of the formula $$\tan\delta = \frac{\Delta s \cdot \cos\omega}{d + \Delta s \sin\omega}$$

5. A professional camera according to claim 4, characterized by the fact that the electronic circuit (30) is developed as a microprocessor.

6. A professional camera according to claim 1, characterized by the fact that the measurement sensor for the displacement of the image and/or the lens standard comprises a pulse generator (42), which generates a number of pulses corresponding to the length of the displacement and cooperates with a counter (43) at the output of which a signal corresponding to the number of pulses counted appears.

7. A professional camera according to claim 1, characterized by the fact that the measurement sensor for the inclination of the camera base (10) comprises a potentiometer (42) behind which there is connected an analog/digital converter (43) at the output of which a signal corresponding to the angle of inclination (ω) appears.

* * * * *